United States Patent [19]

Kleykamp

[11] 4,333,404
[45] Jun. 8, 1982

[54] REINFORCED RAILWAY PEDESTAL LINER
[75] Inventor: Donald L. Kleykamp, Dayton, Ohio
[73] Assignee: Dayco Corporation, Dayton, Ohio
[21] Appl. No.: 160,059
[22] Filed: Jun. 16, 1980
[51] Int. Cl.³ .......................... B61F 5/32; B61F 5/50; F16C 27/02; F16C 33/28
[52] U.S. Cl. .................................. 105/225; 105/207; 264/273; 308/3 R; 308/238; 428/252; 428/256
[58] Field of Search ................... 105/199 C, 207, 225; 264/273; 428/122, 252, 256, 358; 308/3 R, 238

[56] References Cited
U.S. PATENT DOCUMENTS

| | | | |
|---|---|---|---|
| 2,332,373 | 10/1943 | Dorough et al. | 428/252 X |
| 3,554,618 | 1/1971 | Ditzler et al. | 105/225 X |
| 4,001,124 | 1/1977 | Hussey | 105/225 |
| 4,094,253 | 6/1978 | Gage | 105/225 |
| 4,170,180 | 10/1979 | Houston | 105/225 |
| 4,170,675 | 10/1979 | Greenglass | 428/256 |
| 4,188,888 | 2/1980 | Cooper et al. | 105/199 C |
| 4,237,793 | 12/1980 | Holden et al. | 105/225 |
| 4,239,007 | 12/1980 | Kleykamp et al. | 105/207 |

Primary Examiner—Joseph F. Peters, Jr.
Assistant Examiner—Howard Beltran
Attorney, Agent, or Firm—Joseph V. Tassone

[57] ABSTRACT

A substantially U-shaped pedestal liner is provided for disposal between an associated pedestal leg and journal box of a railway pedestal truck and the liner is comprised of ultra high molecular weight polymeric material and has a reinforcing structure embedded in the polymeric material which serves as a matrix therefor and substantially completely surrounds the structure and the structure has openings therein for receiving the polymeric material completely therethrough while enabling better embedment of the structure whereby the structure provides reinforcement while preventing cold flow of the polymeric material.

11 Claims, 5 Drawing Figures

U.S. Patent  Jun. 8, 1982  4,333,404
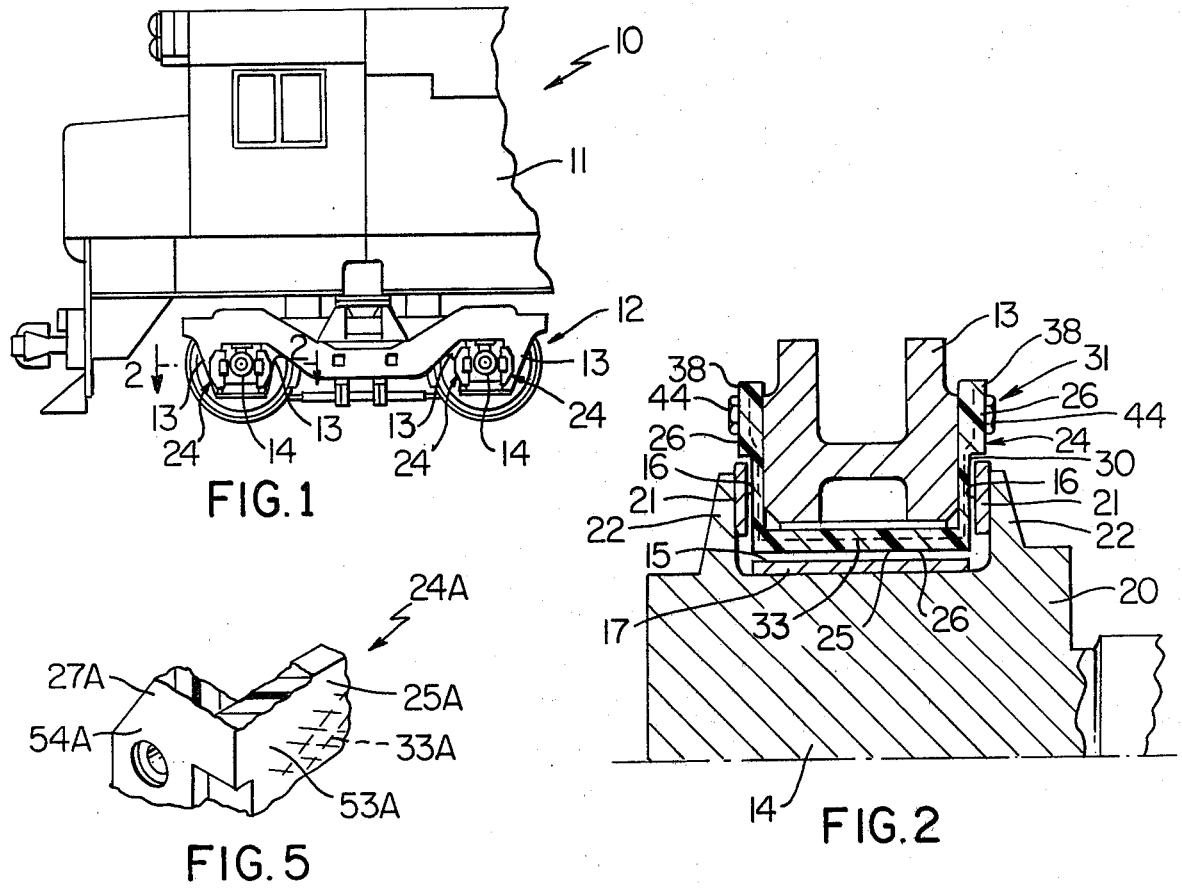
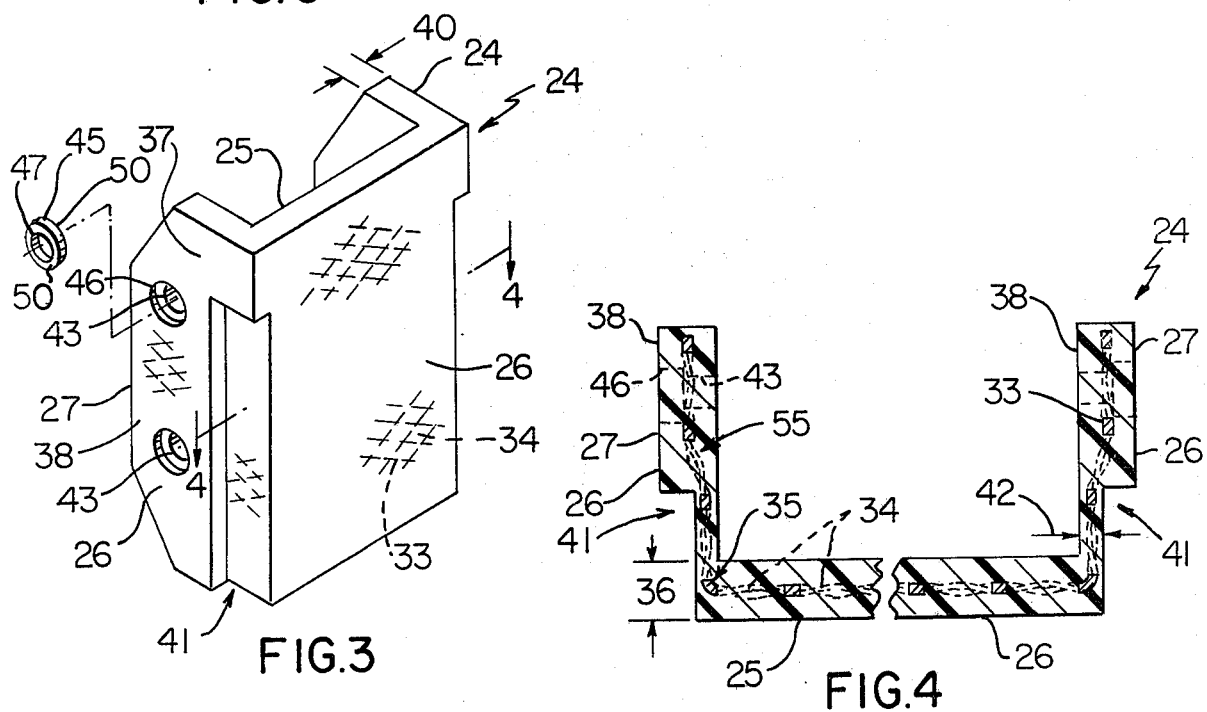

REINFORCED RAILWAY PEDESTAL LINER

BACKGROUND OF THE INVENTION

1. Field of the Invention

This invention relates to railway vehicles and more particularly to pedestal liners for pedestal trucks of such vehicles.

2. Prior Art Statement

There have been numerous railway pedestal liners proposed heretofore for the purpose of protecting the relatively slideable surfaces of a pedestal leg and journal box of a railway vehicle pedestal truck against excessive wear.

For example, U.S. Pat. No. 3,554,618 discloses a U-shaped pedestal liner consisting of a bight and a pair of parallel legs which has an inserted nylon wear plate for the bight which is unsupported in the central portion of the bight and which is free of antifriction material on the outside surfaces of the parallel legs where substantial wear may also occur in a pedestal liner.

U.S. Pat. No. 4,170,180 discloses a pedestal liner comprised of two main components wherein one component is U-shaped and made entirely of polymeric material and the other component is a sheet-like insert also made entirely of polymeric material.

Copending U.S. patent application Ser. No. 30,035, filed Apr. 13, 1979, which is now U.S. Pat. No. 4,237,793 discloses a U-shaped pedestal liner having a bight and a pair of parallel legs and such liner is comprised of a continuous uninterrupted metal backing material defining the bight and parallel legs and antifriction material in the form of an ultra high molecular weight polymeric material fixed against the bight and parallel legs of the backing material whereby the backing material provides optimum support for the antifriction material.

Copending U.S. patent Application Ser. No. 30,036, filed Apr. 13, 1979, which is now U.S. Pat. No. 4,239,007 discloses a U-shaped pedestal liner having a bight and a pair of parallel legs. A first antifriction material is fixed against the bight and a second antifriction material is fixed against the parallel legs with the first and second antifriction materials being ultra high molecular weight polymeric materials having different wear characteristics.

Finally, U.S. Pat. No. 4,188,888 discloses a wear member or liner for center plate structure of a railway vehicle which has reinforcing material embedded therein.

However, in the highly competitive field of railway components, the need exists for a railway pedestal liner which has the requisite antifriction properties yet the construction thereof is such that it has high structural strength and may be attached to an associated pedestal leg in a high-strength manner.

SUMMARY

It is a feature of this invention to provide a high-strength U-shaped pedestal liner for use between a pedestal leg and a journal box of a railway pedestal truck which is of simple and economical construction yet has the requisite antifriction properties for such a pedestal liner.

Another feature of this invention is to provide a pedestal liner of the character mentioned and comprised primarily of antifriction material in the form of high molecular weight polymeric material and which has a reinforcing structure embedded in the said polymeric material which serves as a matrix therefor and substantially completely surrounds such structure wherein the structure has openings therein for receiving the polymeric material completely therethrough thereby enabling better embedment of the structure and the structure provides reinforcement and prevents cold flow of the polymeric material.

Another feature of this invention is to provide a U-shaped pedestal liner of the character mentioned comprised of a bight and a pair of parallel legs extending from opposite ends of the bight and such liner has integral means enabling fastening thereof to its pedestal leg in a high-strength manner.

Another feature of this invention is to provide a pedestal liner of the character mentioned in which the bight thereof has a substantial particular thickness and each of its legs has an upper portion and a rear portion roughly equal in thickness to the particular thickness and the thickness of the upper portion provides an increased strength junction at the upper portion of each leg to the bight while the thickness of the rear portion provides an increased strength portion for fastening the pedestal liner to its associated pedestal leg.

Another feature of this invention is to provide a pedestal liner of the character mentioned which has a cutout of rectangular cross-sectional outline at the intersection of the lower portion of each of its legs with an associated side edge of the bight with each of the cutouts defining a second thickness at the junction of each leg lower portion to the bight with the cutout enabling unobstructed vertical movement of the pedestal liner relative to associated pedestal truck components.

Another feature of this invention is to provide a pedestal liner of the character mentioned having means for fastening the liner to its pedestal leg with the fastening means comprising at least one pair of aligned bores in the legs for receiving an associated fastener therethrough.

Another feature of this invention is to provide a pedestal liner of the character mentioned in which the reinforcing structure is a metal structure having openings therein for receiving the ultra high molecular weight polymeric material therethrough.

Another feature of this invention is to provide a pedestal liner of the character mentioned in which the metal structure is an expanded metal structure and the openings therein are of roughly diamond-shaped outline.

Another feature of this invention is to provide a pedestal liner of the character mentioned in which the ultra-high molecular weight polymeric material is polyethylene having a molecular weight of at least 2 million.

Another feature of this invention is to provide an improved method of making a pedestal liner of the character mentioned.

Therefore, it is an object of this invention to provide an improved pedestal liner and method of making same having one or more of the novel features set forth above or hereinafter shown or described.

Other details, features, uses, objects, and advantages of this invention will become apparent from the embodiments thereof presented in the following specification, claims, and drawing.

BRIEF DESCRIPTION OF THE DRAWING

The accompanying drawing shows present preferred embodiments of this invention, in which FIG. 1 is a fragmentary side view of a railway locomotive comprising pedestal trucks wherein each truck has pairs of pedestal legs and a journal box disposed between each pair of pedestal legs and a pedestal liner of this invention is disposed between each associated pedestal leg and journal box;

FIG. 2 is a fragmentary enlarged cross-sectional view taken essentially on the line 2—2 of FIG. 1 illustrating a typical pedestal liner of this invention disposed in position between its associated journal box and pedestal leg;

FIG. 3 is a perspective view of the pedestal liner of FIGS. 1 and 2;

FIG. 4 is a cross-sectional view taken essentially on the line 4—4 of FIG. 3 and with the central portion thereof broken away; and FIG. 5 is a fragmentary view illustrating another exemplary embodiment of the pedestal liner of this invention.

DETAILED DESCRIPTION

Reference is now made to FIG. 1 of the drawing which illustrates a fragmentary portion of a railway vehicle shown as a portion of a railway locomotive which is designated generally by the reference numeral 10. The locomotive 10 comprises the usual locomotive main body 11 which is supported at each of its opposite ends by a four wheel truck and one of the trucks is shown in FIG. 1 and designated generally by the reference numeral 12. Each truck 12 is a so-called pedestal type truck which is well known in the locomotive art and each truck 12 comprises four pairs of pedestal legs with a typical one of such pedestal legs being illustrated in enlarged view in FIG. 2; and, each leg of each pair is designated by the reference numeral 13 and the usual journal box 14 is disposed between each associated pair of legs 13.

As best seen in FIG. 2, each journal box 14 has a vertically disposed central planar guide surface 15 and a pair of spaced vertically disposed parallel side surfaces 16 disposed on opposite sides of each central guide surface 15. Each central guide surface 15 defines the outside surface of an associated wear plate 17 which is suitably fixed to the main body 20 of the journal box by any suitable means, such as welding, or the like. The side surfaces 16 of the journal box define the outside surfaces of plate members 21 which are suitably fixed, as by welding, to integral extensions 22 which extend from the main body 20 of the journal box 14.

In accordance with the teachings of this invention a U-shaped pedestal liner, which is designated generally by the reference numeral 24, is provided and disposed between an associated pedestal leg 13 and a journal box 14. Each pedestal liner 24 has a roughly U-shaped configuration and has a bight 25 provided with an antifriction material 26 which is adapted to engage an associated guide surface 15. The U-shaped pedestal liner 24 also has a pair of parallel legs, each designated by the same reference numeral 27, extending from opposite side edges of the bight 25 and each leg is provided with an antifriction material also designated by the reference numeral 26 which is adapted to engage an associated side surface 21. The pedestal liner 24 is adapted to be disposed between an associated pedestal leg 13 and journal box 14 and fastened to the associated leg by fastening means designated generally by the reference numeral 31 (FIG. 2) and the fastening means 31 will be described in detail subsequently.

The polymeric material 26 of the pedestal liner 24 is an ultra high molecular weight polymeric material and although any ultra high molecular weight (UHMW) polymeric material may be utilized for this purpose UHMW polyethylene having a molecular weight of at least 2 million is preferred. The preferred range for the molecular weight of the UHMW polyethylene is 4 to 6 million.

The pedestal liner 24 of this invention has the improvement which comprises a reinforcing structure, which is designated generally by the reference numeral 33, embedded in the polymeric material 26 of its bight and parallel legs. The reinforcing structure 33 has openings therein each designated by the reference numeral 34 with a typical opening being thus designated in the illustration of FIG. 3. The openings 34 are particularly adapted to receive the polymeric material 26 therethrough and enable better embeddment of the reinforcing structure 33 and in addition to providing reinforcement, the structure 33 prevents cold flow of the polymeric material.

The reinforcing structure 33 has a substantially U-shaped configuration and is disposed substantially centrally within the polymeric material 26 of its bight 25 and substantially centrally within the polymeric material of its parallel legs 27 whereby the reinforcing structure is embedded substantially centrally between opposed outside surfaces of the bight 26 and opposed outside surfaces of each parallel leg 27. The U-shaped reinforcing structure 33 is a single-piece structure and provides a high-strength connection between each side edge of the bight 25 and an associated parallel leg 27. The U-shaped reinforcing structure 33 has each of its substantially parallel legs connected to the bight thereof on a generous radius 35, thereby avoiding stress concentrations, or the like.

The reinforcing structure 33 may be any suitable perforated reinforcing structure having the openings defined therein as specified and for the purposes specified and may be made of either a metallic or nonmetallic material; however, such reinforcing structure is preferably a grid-like expanded metal structure having the openings 34 therein of diamond-shaped outline, and such expanded metal structure 33 may be of standard type or of the flattened type. In addition, the grid-like structure is preferably made of ferrous metal which has at least a 50% open area.

The pedestal liner 24 has high strength and provides optimum antifriction properties on the exposed surfaces thereof. Thus, upon attaching the liner 24 to an associated pedestal leg 13 and upon movement of the pedestal leg 13 and liner 24 with respect to an associated journal box 14, the liner 24 and leg 13 move with minimum sliding friction interference by the journal box surfaces.

The bight 25 of the pedestal liner 24 has a particular thickness 36 (FIG. 4) which is a substantial thickness and each of the parallel legs 27 has an upper portion 37 and a rear portion 38 of a thickness 40 which is substantially equal to the thickness 36. The thickness 40 of the upper portion 37 provides a high strength junction at the upper portion of each leg 27 to the bight 25 and the thickness 40 of the rear portion 38 provides a high strength portion for fastening the pedestal liner 24 to its pedestal leg 13.

The pedestal liner 24 has a pair of cutouts at its opposite sides and each cutout is designated generally by the reference numeral 41, is of rectangular cross-sectional outline, and is provided at the intersection of the lower portion of each of the legs 27 with an associated side edge of the bight 25. Each cutout 41 defines a second thickness 42 (FIG. 4) for its leg 27 at the junction of its lower portion to the bight 25 and it will be appreciated that the thickness 42 is less than the thickness 40. The cutouts 41 in the pedestal liner 24 enable such liner to be disposed in position between its pedestal leg 13 and journal box 14 and suitably fastened by the fastening means 31 while allowing unobstructed vertical movement of the pedestal liner and its leg relative to the journal box 14. Even with the cutouts 41, the U-shaped reinforcing structure 33 extends centrally through the reduced thickness portion of each leg 27 whereby the strength and structural integrity of the pedestal liner 24 is retained in substantially undiminished manner.

As previously mentioned the pedestal liner 24 has means for fastening such liner to its pedestal leg 13 and such fastening means comprises at least one pair of aligned cylindrical holes or bores in the legs 27; and, in this example two pairs of aligned holes are provided in the liner, as illustrated in FIG. 3, and each hole of each pair is designated by the same reference numeral 43. Each hole 43 is adapted to receive an associated fastener, such as a fastening bolt 44, therethrough for fastening the pedestal liner 24 to its pedestal leg 13. The fastening means 31 also comprises a high strength rigid tubular insert sleeve 45 for each hole 43 and each insert 45 is disposed concentrically within a counterbore 46 in the polymeric material 26 outwardly of the structure 33 (FIG. 4). Each insert 45 has a cylindrical inside surface 47 which defines a longitudinal opening through the insert which has essentially the same diameter as the diameter of the hole 43. Each insert 45 has a pair of annular planar surfaces 50 disposed in parallel relation and defining its opposite ends and each insert 45 is received within its counterbore 46 in the polymeric material 26 of an associated leg 27 and a fastening bolt 44 extended therethrough and through the hole 43 aligned therewith to fasten the liner in position.

Each insert 45 prevents excessive force or pressure from being exerted against the polymeric material surrounded on associated hole 43 and thereby prevents cold flow of the polymeric antifriction material from around the area of the hole 43 upon employing a fastening bolt 44 to fasten the liner in position. The construction and axial length of each liner is such that with the insert 45 received within its counterbore 46 its inner annular surface 50 engages the reinforcing structure 33 and its outer annular surface 50 is disposed substantially coplanar with the outside surface of its associated leg 27.

Each of the holes 43 comprising the fastening means 31 is provided in the comparatively large thickness 40 of the rear portion 38 of each leg 27 and this assures the provision of a high-strength fastening. In addition, the use of an insert 45 in association with each fastening bolt 44 in the large thickness portion 38 with each insert engaging the reinforcing structure 33 further assures that the pedestal liner is fastened in position in a high-strength manner.

Another exemplary embodiment of the pedestal liner of this invention is illustrated in FIG. 5 of the drawing. The pedestal liner of FIG. 5 is very similar to the pedestal liner 24 therefore, such pedestal liner will be designated by the reference numeral 24A and representative parts of such pedestal liner which are similar to corresponding parts of the pedestal liner 24 will be designated in the drawing by the same reference numeral as in the pedestal liner 24 (whether or not such representative parts are mentioned in the specification) followed by the letter designation A. Only those component parts of the pedestal liner 24A which are different from corresponding parts of the pedestal liner 24 will be designated by a new reference numeral each also followed by the letter designation A.

The pedestal liner 24A is also of U-shaped configuration and consists of a bight 25A and a pair of parallel legs each designated by the same reference numeral 27A extending from opposite side edges of the bight 25A. The pedestal liner 24A also has a reinforcing structure 33A of roughly U-shaped cross-sectional configuration embedded therein and such reinforcing structure 33A is also a single-piece structure.

The main difference between the pedestal liner 24A and the pedestal liner 24 is that the pedestal liner 24A instead of consisting entirely of a single polymeric material in the form of an ultra-high molecular weight polyethylene, has a first polymeric material 53A defining the bight thereof and a second polymeric material 54A defining the parallel legs. These specified polymeric materials 53A and 54A have different wear characteristics and antifriction properties; and, each of the polymeric materials 53A and 54A is selected based upon the wear conditions which it is expected to encounter during normal use of its pedestal liner.

Each pedestal liner 24 and 24A may be made utilizing any suitable technique known in the art; however, each liner 24 and 24A is preferably made by first forming the reinforcing structure 33 or 33A thereof into a substantially U-shaped configuration. The forming may be achieved utilizing commercially available forming tools, fixtures, and the like; and each structure 33 and 33A is preferably made of a single-piece of metallic material. In forming each structure 33 and 33A the rear portions of the parallel legs of each structure are offset outwardly as illustrated at 55 in FIG. 3 for the structure 33, to assure that the reinforcing structure is disposed centrally within its leg 27 including both the forward reduced thickness portion and thick rear portion.

After having formed a reinforcing structure 33, for example, into a substantially U-shaped configuration, such structure is disposed in an associated mold device (not shown) or the like, which has cooperating mold components which define the final configuration of the pedestal liner essentially as illustrated in FIG. 3 with the reinforcing structure supported in position in such mold device, polymeric material is introduced in the mold device (preferably in molten form) and under high temperature and pressure conditions. The mold device and polymeric material injected therein defining the pedestal liner are then suitably cooled employing ambient air, liquid cooling, or any suitable technique known in the art. Upon completion of the cooling action the cooperating components of the mold device are moved apart and any flashing removed from the completed pedestal liner 24 thereby resulting in the pedestal liner having the configuration illustrated in FIG. 3.

The forming of the pedestal liner 24A is achieved in a similar manner as the liner 24 by first forming the reinforcing structure 33A in a U-shaped configuration essentially as described above for the reinforcing structure 33. However, in the case of the pedestal liner 24A the mold device is suitably constructed to enable injection therewithin of the two different polymeric materials 53A and 54A which define the bight 25A and parallel legs 27A respectively of the pedestal liner 24A. The manner in which the two different polymeric materials are introduced in the mold device to provide a high-strength single-piece construction is well known and will not be described in detail herein.

Reference has been made throughout this specification to the use of ultra high molecular weight material such as polyethylene to define the polymeric material 26 of the liner 24 and the polymeric materials 53A and 54A of the pedestal liner 24A; and, as mentioned earlier, the UHMW polymeric material preferably has a molecular weight of at least two million. The preferred technique for determining this molecular weight is referred to as the intrinsic viscosity test and is widely used in the United States.

While present exemplary embodiments of this invention, and methods of practicing the same, have been illustrated and described, it will be recognized that this invention may be otherwise variously embodied and practiced within the scope of the following claims.

What is claimed is:

1. In a pedestal liner for a railway vehicle wherein said vehicle comprises, pedestal trucks comprising pairs of pedestal legs and a journal box disposed between each pair of pedestal legs, each journal box having a vertically disposed planar guide surface and a pair of spaced vertically disposed parallel side surfaces disposed on opposite sides of said guide surface, said pedestal liner being roughly U-shaped and having a bight provided with antifriction material which is adapted to engage said guide surface and a pair of parallel legs provided with antifriction material which is adapted to engage said side surfaces, said pedestal liner being adapted to be disposed between an associated pedestal leg and journal box and fastened to its associated pedestal leg, said antifriction material being comprised of ultra high molecular weight polymeric material, the improvement comprising a perforated reinforcing structure embedded in said polymeric material which serves as a matrix therefor and substantially completely surrounds said structure, said structure having openings therein for receiving said polymeric material completely therethrough and enabling better embedment of said structure, said structure providing reinforcement and preventing cold flow of said polymeric material, said reinforcing structure consisting of a single piece of material disposed in a substantially U-shaped configuration and being embedded between opposed outside surfaces of said bight and opposed outside surfaces of each of said parallel legs, and further comprising means for fastening said pedestal liner to its pedestal leg, said fastening means comprising at least one pair of aligned cylindrical bores in said legs each for receiving a fastener therethrough, each of said bores extending through said reinforcing structure.

2. In a pedestal liner for a railway vehicle wherein said vehicle comprises, pedestal trucks comprising pairs of pedestal legs and a journal box disposed between each pair of pedestal legs, each journal box having a vertically disposed planar guide surface and a pair of spaced vertically disposed parallel side surfaces disposed on opposite sides of said guide surface, said pedestal liner being roughly U-shaped and having a bight provided with antifriction material which is adapted to engage said guide surface and a pair of parallel legs provided with antifriction material which is adapted to engage said side surfaces, said pedestal liner being adapted to be disposed between an associated pedestal leg and journal box and fastened to its associated pedestal leg, said antifriction material being comprised of ultra high molecular weight polymeric material, the improvement comprising a perforated reinforcing structure embedded in said polymeric material which serves as a matrix therefor and substantially completely surrounds said structure, said structure having openings therein for receiving said polymeric material completely therethrough and enabling better embedment of said structure, said structure providing reinforcement and preventing cold flow of said polymeric material, said reinforcing structure consisting of a single piece of material disposed in a substantially U-shaped configuration and being embedded substantially centrally between opposed outside surfaces of said bight and opposed outside surfaces of each of said parallel legs, said bight having a particular thickness and each of said legs having an upper portion and a rear portion substantially equal in thickness of said particular thickness, and said substantially equal thickness upper portion providing a high strength junction at the upper portion of each leg to said bight and said substantially equal thickness rear portion providing a high strength portion for fastening said pedestal liner to its pedestal leg.

3. A pedestal liner as set forth in claim 2 in which said bight of said U-shaped liner comprises an ultra high molecular weight polymeric material having certain wear characteristics and said parallel legs of said U-shaped liner are comprised of an ultra high molecular weight material having wear characteristics which are different from the polymeric material comprising said bight.

4. A pedestal liner as set forth in claim 2 in which said reinforcing structure comprises a metal structure having said openings therein for receiving said polymeric material therethrough.

5. A pedestal liner as set forth in claim 4 in which said metal structure comprises a grid-like expanded metal structure having said openings therein provided with a diamond-shaped outline.

6. A pedestal liner as set forth in claim 5 in which said expanded metal structure is made of a ferrous metal and has at least a 50% open area.

7. A pedestal liner as set forth in claim 2 and further comprising a cutout of rectangular cross-sectional outline provided therein at the intersection of the lower portion of each of said legs with an associated side edge of said bight, each of said cutouts defining a second thickness for its leg at the junction of its lower portion to said bight, said second thickness being less than said particular thickness, and said cutouts enabling unobstructed vertical movement of said pedestal liner and its pedestal leg relative to the journal box of its pedestal truck.

8. A pedestal liner as set forth in claim 7 and further comprising means for fastening said pedestal liner to its pedestal leg, said fastening means comprising at least one pair of aligned cylindrical bores in said legs each for receiving a fastener therethrough, each of said bores extending through said reinforcing structure.

9. A pedestal liner as set forth in claim 8 in which said U-shaped single-piece metal structure has an outwardly offset portion in the rear part of each of its parallel legs enabling disposal of each outwardly offset portion centrally within the polymeric material defining an associated leg of its liner.

10. A pedestal liner as set forth in claim 8 and further comprising, a counterbore in polymeric material comprising each of said legs with each counterbore being disposed concentrically with and outwardly of an associated bore, and an insert disposed within each counterbore, each of said inserts having an inner end engaging said reinforcing means and an outer end disposed substantially coplanar with the outside surface of its associated leg.

11. A pedestal liner as set forth in claim 10 in which said ultra high molecular weight polymeric material is polyethylene having a molecular weight of at least two million.

* * * * *